United States Patent Office 3,276,264
Patented Oct. 4, 1966

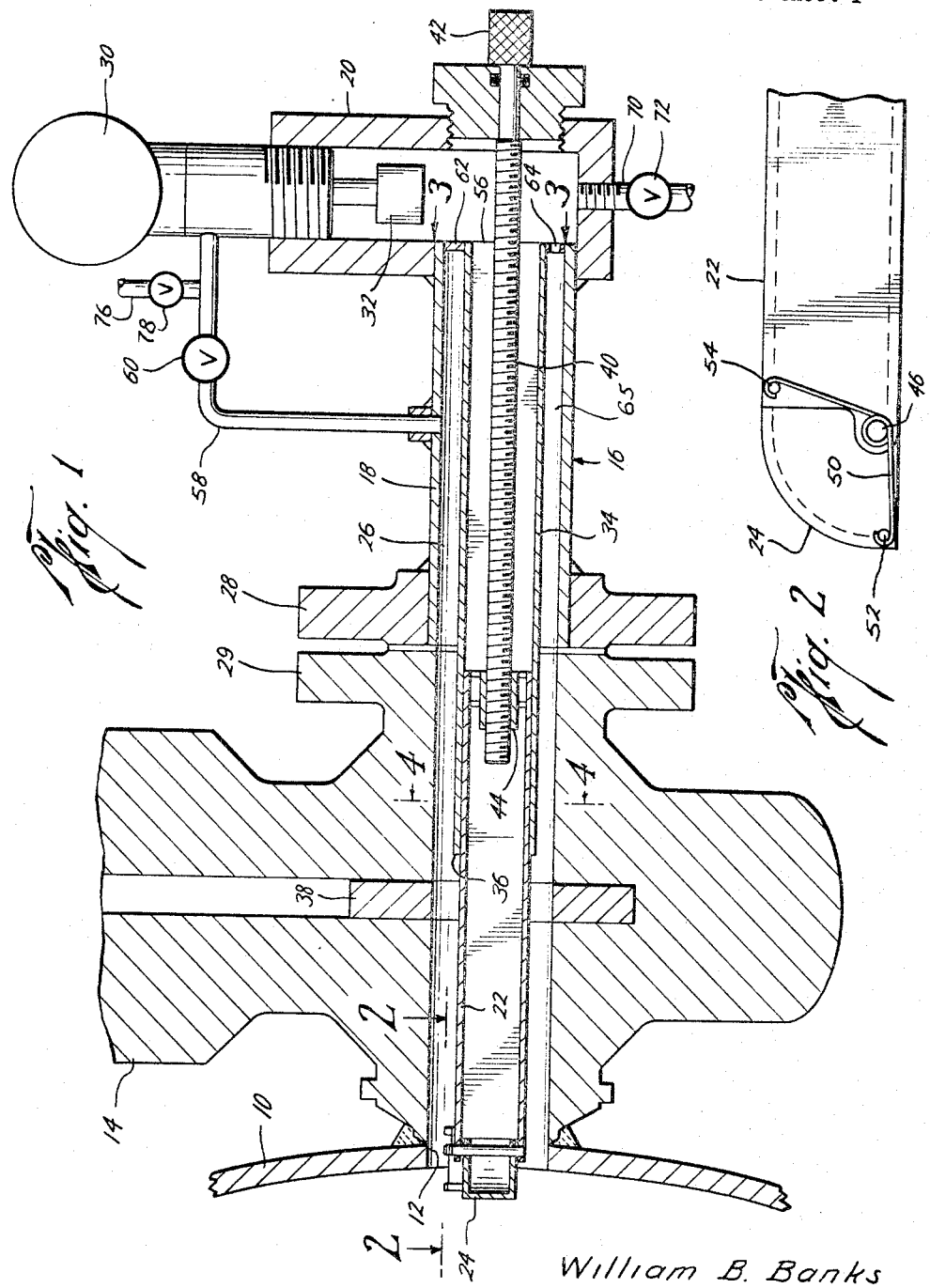

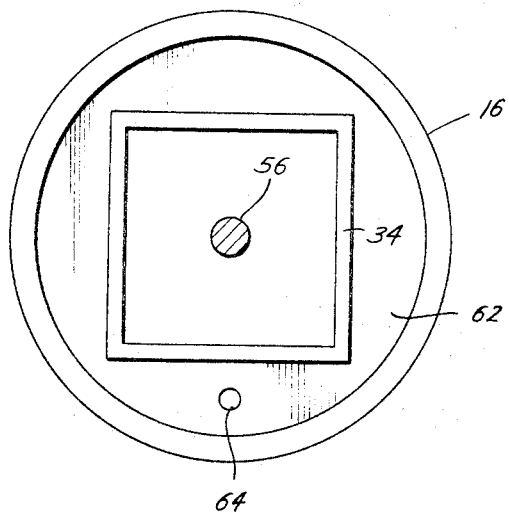
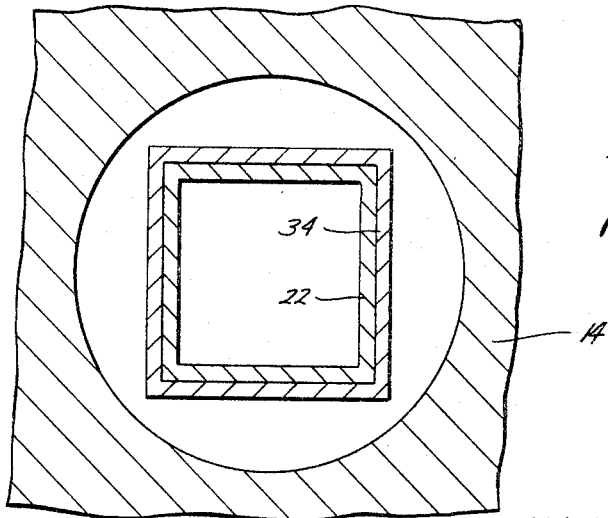

3,276,264
PIPE SAMPLING APPARATUS
William B. Banks, Houston, Tex., assignor to Automation Products, Inc., Houston, Tex., a corporation of Texas
Filed Apr. 10, 1964, Ser. No. 358,732
8 Claims. (Cl. 73—422)

The present invention relates to a pipe sampling apparatus, and more particularly, relates to an apparatus for sampling fluid flowing in a pipeline.

Generally, it is desired to monitor or sample fluid flowing through a pipeline for various purposes such as determining the interface between various liquids, or measuring various physical properties of the fluid such as density of viscosity. However, it is important that the measuring apparatus does not extend into the pipeline and interfere with cleaning the pipeline or does not cause too great pressure drop. It is therefore a general object of the present invention to provide a pipe sampling apparatus which will not interfere with cleaning the interior of the pipeline nor which will cause an excessive pressure drop.

Generally, when an opening is made in a pipeline, a valve is usually connected to the opening to act as a safety device to control the opening and closing of the pipe opening. It is therefore another object of the present invention to provide a pipe sampling apparatus which will operate through a valve and will withdraw a continuous sample of the fluid flow through the pipeline for measuring various physical properties of the fluid.

An object of the present invention is the provision of a deflector which is normally positioned inside the pipeline for deflecting a portion of the pipeline fluid out of the pipeline for testing, but which is movably supported and arranged to be moved out of the pipeline and out of the way on contact by objects moving through the pipeline. A further object is the provision of deflector which is pivotally supported at a point outside of the pipeline but which is normally urged by a spring into the pipeline and directed upstream for diverting a sample of pipeline fluid out of the line.

A still further object of the present invention is the provision of a pipeline sampling apparatus having a measuring chamber and an elongate extension member in communication with the chamber which may be extended and retracted toward and away from the pipeline and includes a deflector which may be inserted in the pipeline for directing fluid flow through the measuring chamber for measuring various properties of the fluid.

Yet a further object of the present invention is the provision of an apparatus for sampling fluid flow in a pipeline which includes a deflector connected to the end of a movable elongate extension member for deflecting fluid from the pipeline to a measuring chamber wherein the deflector is movable into and out of the pipeline on contact by a pipeline cleaner and thus does not interfere with normal pipeline cleaning operations.

A still further object of the present invention is the provision of a pipeline sampling apparatus wherein a deflector is provided which is extendible into and retractable from a pipeline and directs a continuous flow of fluid to a movable extension member and to a measuring chamber for continuously measuring various properties of the fluid and then returns the fluid through a return passageway to the pipeline.

Yet a further object of the present invention is the provision of a pipe sampling apparatus for obtaining continuous samples of fluid flowing through a pipeline wherein a deflector may be inserted into the pipeline through a valve and directed upstream to withdraw samples through a measuring chamber and wherein the measuring chamber may include an opening for the insertion of suitable calibrating fluids so as to calibrate the measuring instrument in the measuring chamber.

Still a further object of the present invention is the provision of an elongate pipe sampling means which may be extended through and retracted from a valve into a pipeline for withdrawing a continuous sample into a measuring chamber and return it to the pipeline including a clean out passageway between the bottom of the measuring chamber and the pipeline for removing debris from the measuring chamber.

Other and further objects, features and advantages will be apparent from the following description of a presently preferred embodiment of the invention, given for the purpose of disclosure, and taken in conjunction with the accompanying drawings, where FIGURE 1 is a fragmentary elevational view, partly in cross section and partly schematic illustrating the apparatus of the present invention, FIGURE 2 is a cross-sectional view taken along the line 2—2 of FIGURE 1, FIGURE 3 is a cross-sectional view taken along line 3—3 of FIGURE 1, and FIGURE 4 is a cross-sectional view taken along line 4—4 of FIGURE 1.

Referring now to the drawings, and particularly to FIGURE 1, a fragmentary cross-sectional view of a pipeline 10 is shown wherein the usual fluids are transported. Generally, in providing an opening 12 into the pipeline 10 a conventional shut-off valve 14 is provided as a safety feature so that the pipeline does not have to be shut down when measuring instruments or other devices are inserted through the opening 12. Since the valve 14 forms no part of the present invention, and is conventional, no further description is believed to be necessary.

While, of course, a suitable measuring instrument could be connected directly through the opening 12 and into the interior of the pipeline 10, this is highly undesirable as it would interfere with the cleaning of the pipeline by cleaners or "pigs" and would also create a pressure drop in the line. The present invention is generally designated by the numeral 16 and may include a housing 18, a measuring chamber 20, and an elongated movable extension member 22 which is in fluid communication with the measuring chamber 20, a deflector or scoop 24 movably connected to the outer end of the extension member 22, and a return passageway 26 returning the measured fluid back to the pipeline 10.

The housing 18 is suitably connected to the flange 29 of the valve 14 by a conventional flange 28, or in the event that the valve 14 is omitted, is connected directly to the pipeline 10. The measuring chamber 20 is provided through which a continuous flow of fluid from the pipe line is maintained and which is adapted to hold any suitable measuring device 30, for example such as described in my Patent No. 3,100,390 for measuring various physical properties of fluid such as fluid interface, fluid density, viscosity or other properties. The sensing unit 32 of the measuring instrument 30 thus projects into the measuring chamber 20 into intimate contact with the fluid which flows therethrough and suitably measures the value or change in value of various physical properties of the fluid as is more fully described in my above mentioned patent. However, in order for the measuring device 30 to provide corresponding readings of the values of the fluid passing through the pipeline 10 it is desirable that the pipe sampling apparatus 16 provide a positive and continuous flow of fluid into an out of the measuring chamber 20.

An elongate support tube 34 is provided which is supported by the housing 18 and is in fluid communication with the measuring chamber 20. In turn, the support member 34 telescopically engages and supports a movable elongate extension member 22. It is to be noted that it is preferable for the end 36 of the elongate support member to terminate short of the valve closure member 38 of the valve 14 in the event that a valve is used with the apparatus 16 so that the entire pipe sampling apparatus 16 may be withdrawn, as will be more fully described hereinafter, and connected or disconnected while the valve 14 is closed thereby preventing loss of fluid from the pipeline 10.

Suitable means are provided for extending and retracting the extension member 22 toward and away from the pipeline 10 such as a threaded drive shaft 40 which may be rotated from outside of the housing 18 by head 42 and in turn longitudinally moves a drive bushing 44 and the extension member 22 to which the bushing 44 is connected. It is to be noted that the elongate extension member 22 as shown in FIGURE 1 is in its extended position but yet does not extend into the interior of the pipeline 10 so as to interfere with any cleaning operation.

Referring now to FIGURES 1 and 2, a suitable deflector or scoop 24 is pivotally connected to the elongate extension member 22 by a pivot pin 46. Thus as shown, the deflector or scoop 24 is positioned in the extended position inside of and along the inner wall of the pipeline 10 and is directed upstream so as to receive the fluid flow and deflect it into the extension member 22, through the support member 34, and into the measuring chamber 20. In order to insure that the deflector or scoop 24 is directed upstream, suitable indexing means is provided such as having the telescoping cross section of the support member 34 and the extension member 22 nonsymmetrical such as being square. Additionally, by providing square tubing for the support member 34 and the extension member 22 additional strength in the cantilever structure is provided.

Referring now to FIGURES 1 and 2, a suitable spring 50 is provided connected between the deflector 24 and the extension member 22 to act between pins 52 and 54 to yieldably urge the deflector or scoop 24 outwardly into the pipeline 10. However, as a cleaner or "pig" moves along the interior of the pipeline 10 it will strike the deflector 24, overcome the spring 50 and rotate the deflector 24 about the pivot 46 and out of the way. However, as soon as the cleaner passes by the opening 12 the spring 50 will return the deflector 24 to its sampling position.

In order to provide a continuous flow of pipeline fluid through the measuring chamber 20 a return passageway 26 is provided. Since the incoming fluid flows through the deflector 24, the extension member 22, through the support member 34 and out end 56 into the measuring chamber on one side of the sensor 32, the return passageway from the measuring chamber 20 should be on the opposite side of the sensor 32. Thus, the return passageway includes a line 58 having a valve 60 which is connected to the measuring chamber at a point remote from the end 56 or inlet to the measuring chamber 20 whereby the fluid flow is returned to the pipeline 10. Thus, it is noted that a tube flange 62 (FIGURE 3) is provided between the housing 18 and the support member 34 blocking the return from the measuring chamber 20 except for a restricted opening 64 at the bottom of the measuring chamber. The restricted opening 64 is a clean out passageway between the bottom of the measuring chamber 20 to the pipeline 10 whereby any debris or sludge in the fluid may settle to the bottom of the measuring chamber 20 and thus be suitably cleaned out by fluid flow and thus prevents the build up of material in the measuring chamber which might interfere with the measuring device 30. Thus, the valve 60 may regulate the amount of flow through line 58 and consequently the amount of flow through the opening 64 and the clean out passageway 65 in order to keep the chamber 20 clean.

A suitable inlet 76 and valve 78 is provided in communication with the measuring chamber 20 whereby a calibrating fluid may be inserted in the measuring chamber 20 to suitably calibrate the measuring instrument 30.

A suitable drain 70 and drain valve 72 are provided in communication with the lower end of measuring chamber 20 for draining the chamber.

In operation, the pipe sampling device 16 of the present invention may be suitably connected by the flange 28 to the flange 29 of the valve 14 while the valve is in a closed position and the sampling apparatus is in a retracted position. After connection the valve 14 may be opened, the head 42 rotated which in turn rotates the drive shaft 40 so as to extend the extension member 32 towards the pipeline 10. In its fully extended position the movable deflector or scoop 24 is positioned interiorly of the pipeline 10 with the remainder of the sampling apparatus 16 remaining outside of the interior of the pipeline. Thus, the only element protruding into the pipeline 10 is the movable deflector or scoop 24 which may be rotated out of the way on the passage of any device through the interior of the pipeline such as a pipeline cleaner.

Thus, with the deflector or scoop 24 directed upstream in the pipeline 10, the fluid moving through the pipeline 10 will by its own force be caught by the deflector and passed through the extension member 22, the support member 34 and into the measuring chamber 20, past the sensor 32 of the measuring device 30, through valve 60, return line 58 and through the return passageway 26 back to the pipeline 10. Thus, a continuous flow of fluid passes through the measuring chamber 20 and the measuring device 30 will provide a continuous measurement of the value or changes in value of the physical property of the flowing material being measured.

The present invention is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. An apparatus for continuously sampling fluid flowing in a pipeline comprising, a housing adapted to be connected to the pipeline, an elongate support member supported by the housing and positioned exteriorly of the pipeline, a deflector movably connected to the support member and normally extending into the pipeline and directed upstream for continuously deflecting a sample of fluid out of the pipeline, yieldable means normally holding said deflector in the pipeline but allowing the deflector to be moved out of the pipeline by contact with objects in the pipeline, and a return passageway in fluid communication between the deflected fluid and the pipeline for returning the sampled fluid to the pipeline.

2. An apparatus for sampling fluid flowing in a pipeline comprising, a measuring chamber adapted to be positioned outside the pipeline, an elongate extension member in fluid communication with the measuring chamber, a deflector movably connected to one end of the extension member and positioned to deflect flowing fluid into the extension member when the deflector is positioned in the pipeline, means for extending and retracting the extension member and moving the deflector into and out of the pipeline, means connected between said deflector and extension member yieldably urging said deflector outwardly beyond the one end of the extension member but allowing the deflector to be moved out of said pipeline, and
a return passageway connected between the measuring chamber and said pipeline.

3. An apparatus for sampling fluid flowing in a pipeline comprising,
   a housing adapted to be connected to a pipeline, said housing including a measuring chamber,
   an elongate extension member supported by the housing and in fluid communication with the measuring chamber,
   a deflector movably connected to the end of the extension member remote from the chamber and positioned to deflect flowing fluid into the extension member and the chamber when the deflector is positioned in said pipeline,
   means for extending and retracting said extension member and thus the deflector toward and away from the pipeline,
   means connected between the deflector and the extension member yieldably urging the deflector outwardly and beyond the end of the extension member but allowing the deflector to be moved out the pipeline,
   indexing means connected between the housing and the elongate deflector for directing the deflector upsteam in the pipeline, and
   a return passageway connected between the measuring chamber and the pipeline.

4. The apparatus of claim 3 wherein said housing includes an opening to said measuring chamber for admitting fluids for calibrating measuring devices positioned in the measuring chamber.

5. The apparatus of claim 3 including,
   a clean out passageway connected between the bottom of the measuring chamber and the pipeline, and
   a valve in said return passageway.

6. An apparatus for sampling fluid flowing in a pipeline comprising,
   a housing adapted to be connected to a pipeline, said housing including a measuring chamber adapted to receive a measuring instrument,
   an elongate support member supported by the housing and positioned in fluid communication with the measuring chamber,
   an elongate extension member telescoping with and supported by the elongate support member and movable toward and away from the pipeline,
   a deflector pivotally connected to the end of the extension member nearest said pipeline and positioned to be directed upstream when moved into the pipeline,
   means for extending and retracting the extension member towards and away from the pipeline but not into the pipeline, but extending and retracting the deflector into and from the pipeline,
   spring means yieldably urging the deflector outwardly from the outer of the extension member, and
   a return passageway connected between the pipeline and a point in the measuring chamber spaced from the point of fluid communication of the support member with the measuring chamber.

7. The apparatus of claim 6 wherein the elongate support member and the elongate extension member comprise in cross section square tubing.

8. An apparatus for sampling fluid flowing in a pipeline having an opening and a valve controlling the fluid flow through the opening comprising,
   a housing adapted to be connected to the valve, said housing including a measuring chamber to receive a fluid measuring instrument,
   an elongate support member supported by the housing in fluid communication with the measuring chamber and extending toward the pipe opening but terminating on the side of the valve closure member remote from the pipeline,
   an elongate extension member telescoping with and supported by the elongate support member and movable through the valve and toward and away from the pipeline,
   a deflector pivotally connected to the end of the extension member nearest the pipeline and positioned to be directed upstream when moved into the pipeline,
   means for extending and retracting the extension member towards and away from the pipeline but not into the pipeline, but extending and retracting the deflector into and from the pipeline,
   spring means yieldably urging the deflector outwardly from the outer end of the extension member and into the pipeline,
   a return passageway connected between the pipeline and through the valve and to the measuring chamber spaced from the point of fluid communication of the support member with the measuring chamber, and
   a clean out passageway connected between the bottom of the measuring chamber and the pipeline.

References Cited by the Examiner

UNITED STATES PATENTS

| 1,235,090 | 7/1917 | Williams | 73—423 |
| 3,066,539 | 12/1962 | Coper | 73—423 |

LOUIS R. PRINCE, *Primary Examiner.*

S. C. SWISHER, *Assistant Examiner.*